No. 895,083. PATENTED AUG. 4, 1908.
J. H. A. GARDINER.
OIL FILTER.
APPLICATION FILED APR. 15, 1908.
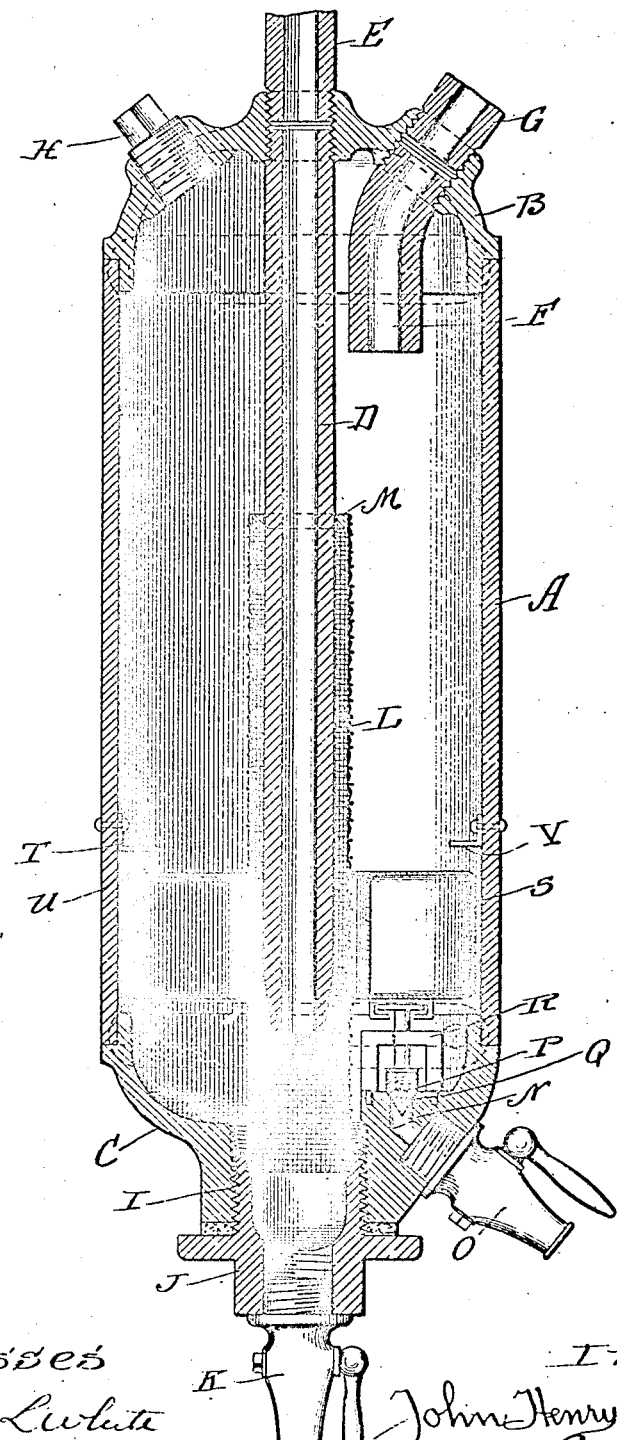
Witnesses
Harry R. White
Ray White
Inventor
John Henry A. Gardiner
By Rudolph ...

UNITED STATES PATENT OFFICE.

JOHN HENRY A. GARDINER, OF CHICAGO, ILLINOIS.

OIL-FILTER.

No. 895,083.             Specification of Letters Patent.             Patented Aug. 4, 1908.

Application filed April 15, 1908. Serial No. 427,130.

*To all whom it may concern:*

Be it known that I, JOHN HENRY A. GARDINER, a citizen of the United States, residing at Chicago, in the county of Cook and State of Illinois, have invented certain new and useful Improvements in Oil-Filters; and I do hereby declare the following to be a full, clear, and exact description of the invention, such as will enable others skilled in the art to which it appertains to make and use the same.

This invention relates to a novel construction in an oil filter particularly adapted for the filtration of hydro-carbon liquids and the separation of water therefrom, the object being to provide a very simple and efficient device of this character, and consists in the features of construction and combinations of parts hereinafter fully described and claimed.
The accompanying drawing shows an oil filter constructed in accordance with my invention in central vertical section.

My invention is not generically new and consists more particularly in the specific construction whereby certain advantages over oil filters now known to me are obtained, one of the principal advantages residing in the ease of effecting cleansing and repairs, and another consisting in the compactness of the device.

Other advantages will be apparent from the following specification.

My said oil filter comprises a preferably cylindrical casing A equipped at its ends with substantially semi-spherical or relatively deeply dished caps B and C. The upper cap B is provided with a central threaded opening in which one end of a tube D depending into and disposed centrally of said casing A is secured as is also the delivery end of a supply pipe E. Disposed adjacent said central opening are one or more threaded openings, each of which is adapted to receive the threaded portion of a short depending tube or nipple F and the threaded end of the suction pipe G leading to the carbureter of a hydro-carbon engine, said filter being adapted to feed one or more of the latter, the unused outlets being sealed by means of plugs H. The lower cap C is provided with a large threaded central opening I receiving the upper end of a cylindrical member or nipple J equipped between its ends with an annular flange preferably of polygonal outline to re-
ceive a wrench, a petcock K being mounted
in the lower or discharge end of said nipple.
Secured at its lower end to the upper end of said nipple J is a cylinder L of very fine mesh wire cloth of larger diameter than and receiving the lower end portion of the tube D, said cylinder L being equipped at its upper end with an internal packing ring or flange M fitting telescopically over said tube D and preventing any liquid passing out of said cylinder L except through the peripheral wall thereof. Oil passing into the casing through said tube D is discharged first into said cylinder L in which any contained solids are retained, the liquids passing readily through the foraminated wall thereof and in passing slowly toward the outlets becomes separated, the heavier liquid (water) settling at the bottom. Such water together with gritty particles settling in said nipple J are drained off at intervals through said petcock K. If desired, the nipple J may be removed at intervals together with the cylinder L and thoroughly cleansed.

I contemplate providing means for automatically draining off water collecting in the bottom of the apparatus above a given level therein and to this end provide an outlet N in the cap C controlled by a petcock O and also by a valve P seating on the valve-seat Q formed at the inner end of said outlet, the said valve having a stem movable in a suitable guide R and secured at its upper end to a float S so adjusted in weight as to exceed the weight or specific gravity of the hydrocarbon liquid and be of less weight than water, said float being thus adapted to be carried by the water collecting in the bottom of said apparatus and be raised thereby to unseat said valve P and permitting a certain quantity of water to be drained off upon opening the said petcock O. Said float is preferably ring-shaped surrounding said cylinder L and is equipped with a guide pin T passing through an opening in a projection U secured to the wall of the casing A and which as well as the projection V forms a stop to limit the upward movement of said float. If the petcock O is left open the water will be automatically drained off at intervals and if maintained normally closed the said valve P will serve to prevent the draining off of hydro-carbon liquid at any time that said petcock O is opened for the purpose of draining off the water. The connection of the valve stem with the float is preferably relatively loose so as to permit listing of the float.

I claim as my invention:

1. An oil filter comprising a cylindrical casing equipped at its ends with caps each provided with a central threaded opening, a nipple secured in the central opening of the lower cap, a foraminated cylinder secured at its lower end to said nipple, a central depending supply pipe secured in the central opening of the upper cap and entering said foraminated cylinder, a petcock at the lower end of said nipple, and an outlet for liquid in the upper cap, said supply pipe having connection with a source of supply of oil.

2. An oil filter comprising a cylindrical casing equipped at its ends with caps each provided with a central threaded opening, a nipple secured in the central opening of the lower cap, a foraminated cylinder secured at its lower end to said nipple, a central depending supply pipe secured in the central opening of the upper cap and entering said foraminated cylinder, the latter being contracted at its upper end to telescopically receive said pipe a petcock at the lower end of said nipple, and an outlet for liquid in the upper cap, said supply pipe having connection with a source of supply of oil.

3. An oil filter comprising a casing provided at its lower end with a threaded opening, a nipple equipped at one end with a petcock, fitting said opening and secured therein, a cylinder of wire cloth and of smaller diameter than said opening secured at its lower end to said nipple, a supply pipe entering said casing at its opposite end and terminating within said cylinder, the latter being contracted at its free end to snugly fit said supply pipe, and an outlet for oil above the lower end portion of said casing.

4. An oil filter comprising a casing provided at its lower end with a threaded opening, a nipple equipped at one end with a petcock, fitting said opening and secured therein, a cylinder of wire cloth and of smaller diameter than said opening secured at its lower end to said nipple, a supply pipe entering said casing, at its opposite end and terminating within said cylinder, the latter being contracted at its free end to snugly fit said supply pipe, there being an outlet for water in the lower end portion of said casing, a float in the latter of less specific gravity than water and greater specific gravity than oil, and a valve actuated thereby and controlling said outlet, there being an outlet for filtered oil above the lower end portion of said casing.

In testimony whereof, I have signed my name in the presence of two subscribing witnesses.

JOHN HENRY A. GARDINER

Witnesses:
  RUDOLPH WM. LOTZ,
  E. L. MOORE.